United States Patent
Zhao et al.

(10) Patent No.: US 11,226,518 B2
(45) Date of Patent: Jan. 18, 2022

(54) DISPLAY PANEL, AND FRAME SEALANT APPLICATION DEVICE AND APPLICATION METHOD THEREOF

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Detao Zhao, Beijing (CN); Yangheng Li, Beijing (CN); Gang Yu, Beijing (CN); Bin Li, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 124 days.

(21) Appl. No.: 16/094,968

(22) PCT Filed: Feb. 27, 2018

(86) PCT No.: PCT/CN2018/077411
§ 371 (c)(1),
(2) Date: Oct. 19, 2018

(87) PCT Pub. No.: WO2018/177059
PCT Pub. Date: Oct. 4, 2018

(65) Prior Publication Data
US 2019/0101775 A1    Apr. 4, 2019

(30) Foreign Application Priority Data

Mar. 28, 2017 (CN) .......................... 201710194136.4

(51) Int. Cl.
*G02F 1/1339* (2006.01)
*G02F 1/13* (2006.01)

(52) U.S. Cl.
CPC .......... *G02F 1/1339* (2013.01); *G02F 1/1303* (2013.01); *C09K 2323/00* (2020.08);
(Continued)

(58) Field of Classification Search
CPC .... G02F 1/1339; G02F 1/1341; G02F 1/1303; G02F 2001/13398; G02F 1/13398;
(Continued)

(56) References Cited

U.S. PATENT DOCUMENTS

| 5,739,882 A | 4/1998 | Shimizu et al. |
| 2006/0017870 A1 | 1/2006 | Nagata |

(Continued)

FOREIGN PATENT DOCUMENTS

| CN | 101329480 A | 12/2008 |
| CN | 101957512 A | 1/2011 |

(Continued)

OTHER PUBLICATIONS

Jin. "Affect on Performance by Hydrophobic Structure." Surfactant Chemistry (Second Edition). China University of Science and Technology Press. No date. pp. 37-42. 13 total pages with translation attached.

(Continued)

*Primary Examiner* — Ruiyun Zhang
(74) *Attorney, Agent, or Firm* — Leason Ellis LLP

(57) ABSTRACT

A display panel, a sealant coating device and a method for sealant coating are provided. The display panel includes a display area and a peripheral area and further includes oleophobic sealant provided in the peripheral area on a side near the display area and hydrophobic sealant provided in (Continued)

the peripheral area on a side away from the display area and surrounding the oleophobic sealant.

6 Claims, 3 Drawing Sheets

(52) U.S. Cl.
CPC .... *C09K 2323/05* (2020.08); *C09K 2323/057* (2020.08); *G02F 1/13398* (2021.01)

(58) Field of Classification Search
CPC .. C08K 3/36; C09K 2323/00; C09K 2323/05; C09K 2323/057
USPC .............. 428/1.6, 1.5, 1.52, 1.53, 1.54, 1.1; 277/628; 349/153; 156/275.3
See application file for complete search history.

(56) References Cited

U.S. PATENT DOCUMENTS

| | | | |
|---|---|---|---|
| 2007/0129480 A1* | 6/2007 | Nowak | C09J 11/04 524/493 |
| 2015/0062524 A1 | 3/2015 | Kim et al. | |
| 2016/0223880 A1 | 8/2016 | Lee | |
| 2016/0237326 A1 | 8/2016 | Zhao et al. | |
| 2018/0105724 A1 | 4/2018 | Zhang et al. | |

FOREIGN PATENT DOCUMENTS

| | | |
|---|---|---|
| CN | 104327772 A | 2/2015 |
| CN | 104730774 A | 6/2015 |
| CN | 105158990 A | 12/2015 |
| CN | 105542685 A | 5/2016 |
| CN | 105842931 A | 8/2016 |
| CN | 106896588 A | 6/2017 |

OTHER PUBLICATIONS

International Search Report and Written Opinion in corresponding PCT Application No. PCT/CN2018/077411, dated May 25, 2018 with English Translation.

Chinese Office Action in corresponding Chinese Patent Application No. 201710194136.4 dated Apr. 4, 2019 (an English translation attached hereto). 19 pages.

* cited by examiner

US 11,226,518 B2

DISPLAY PANEL, AND FRAME SEALANT APPLICATION DEVICE AND APPLICATION METHOD THEREOF

CROSS REFERENCE TO RELATED APPLICATIONS

The present application is a U.S. National Stage Application under 35 U.S.C. § 371 of International Patent Application No. PCT/CN2018/077411 filed on Feb. 27, 2018, which claims priority to Chinese patent application No. 201710194136.4 filed on Mar. 28, 2017, DISPLAY PANEL, AND FRAME SEALANT APPLICATION DEVICE AND APPLICATION METHOD THEREOF which are incorporated herein by reference in their entireties.

TECHNICAL FIELD

Embodiments of the present disclosure relate to a display panel, a sealant coating device and a method for sealant coating.

BACKGROUND

As an important material used for production of liquid crystal display panels, the sealant is operable to bond a lower substrate and an upper substrate firmly together and protect the entire overlay of various circuit wiring on the lower substrate, i.e. the substrate on which thin film transistors (TFTs) are arranged in an array, very well from corrosion.

SUMMARY

Embodiments of the present disclosure provide a display panel, a sealant coating device and a method for sealant coating.

Embodiments of the present disclosure employ the following technical proposals.

In a first aspect, a display panel is provided by embodiments of the present disclosure, comprising: a display area and a peripheral area; an oleophobic sealant provided in the peripheral area on a side near the display area; and a hydrophobic sealant provided in the peripheral area on a side away from the display area and surrounding the oleophobic sealant.

For example, the oleophobic sealant comprises a matrix sealant material and particles dispersed in the matrix sealant material, the dispersed particles having oleophobic first functional groups on their surfaces.

For example, the oleophobic first functional group comprises at least one of —OH, —CHO, —COOH and —NH$_2$.

Optionally, the hydrophobic sealant comprises a matrix sealant material and particles dispersed in the matrix sealant material, the dispersed particles having hydrophobic second functional groups on their surfaces.

For example, the hydrophobic second functional group comprises at least one of —C$_n$H$_{(2n+1)}$, —CH=CH$_2$, —C$_6$H$_5$, a halogen atom and —NO$_2$, where n is a positive integer.

Optionally, the material of the dispersed particles includes any of silicon dioxide, silicon and aluminum oxide (Al$_2$O$_3$).

Optionally, the dispersed particles are in a spherical shape.

In a second aspect, a device for sealant coating is provided by an embodiment of the present disclosure, comprising a first sealant supplying container, a second sealant supplying container and a spray head. The spray head comprises a first accommodation chamber, a second accommodation chamber and a slit opening. The first accommodation chamber and the second accommodation chamber are in intercommunication at the area near the slit opening. The first sealant supplying container and the second sealant supplying container are in communication with ends of the first accommodation chamber and the second accommodation chamber away from the slit opening and configured to contain oleophobic sealant and hydrophobic sealant, respectively.

Optionally, the device for sealant coating further comprises a pressure controller to control the feeding amount of sealant from the first sealant supplying container and/or the second sealant supplying container.

In a third aspect, a coating method using the device for sealant coating is provided in an embodiment of the present disclosure, comprising: allowing a side of the second accommodation chamber of the spray head to face the display area of the first substrate in the display panel; allowing a side of the first accommodation chamber of the spray head to face away from the display area; and controlling the spray head to spray the sealant along the peripheral area of the first substrate so as to form the hydrophobic sealant in the peripheral area and on the side near the display area and form the oleophobic sealant in the peripheral area on the side away from the display area and surrounding the hydrophobic sealant.

BRIEF DESCRIPTION TO THE DRAWINGS

Embodiments of the present disclosure will be described in more detail below with reference to accompanying drawings to allow an ordinary skill in the art to more clearly understand embodiments of the present disclosure, in which.

DETAILED DESCRIPTION

Technical solutions of the embodiments will be described in a clearly and fully understandable way in connection with the drawings related to the embodiments of the disclosure. It is apparent that the described embodiments are just a part but not all of the embodiments of the disclosure. Based on the described embodiments herein, a person of ordinary skill in the art can obtain other embodiment(s), without any creative work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present application, are not intended to indicate any sequence, amount or importance, but for distinguishing various components. Also, the terms, such as "comprise/ comprising," "include/including," or the like are intended to specify that the elements or the objects stated before these terms encompass the elements or the objects and equivalents thereof listed after these terms, but not preclude other elements or objects. The terms, "on," "under," "a side," "another side," or the like are only used to indicate relative position relationship, and when the absolute position of the object which is described is changed, the relative position relationship may be changed accordingly.

Structural dimensions involved in embodiments of the present disclosure range generally in order of magnitude from nanometer to millimeter (nm~mm), and for purpose of clear explanation, dimensions of structures in the accompanying drawings of embodiments of the present disclosure are exaggerated and not representative of actual dimensions.

Figure 1:
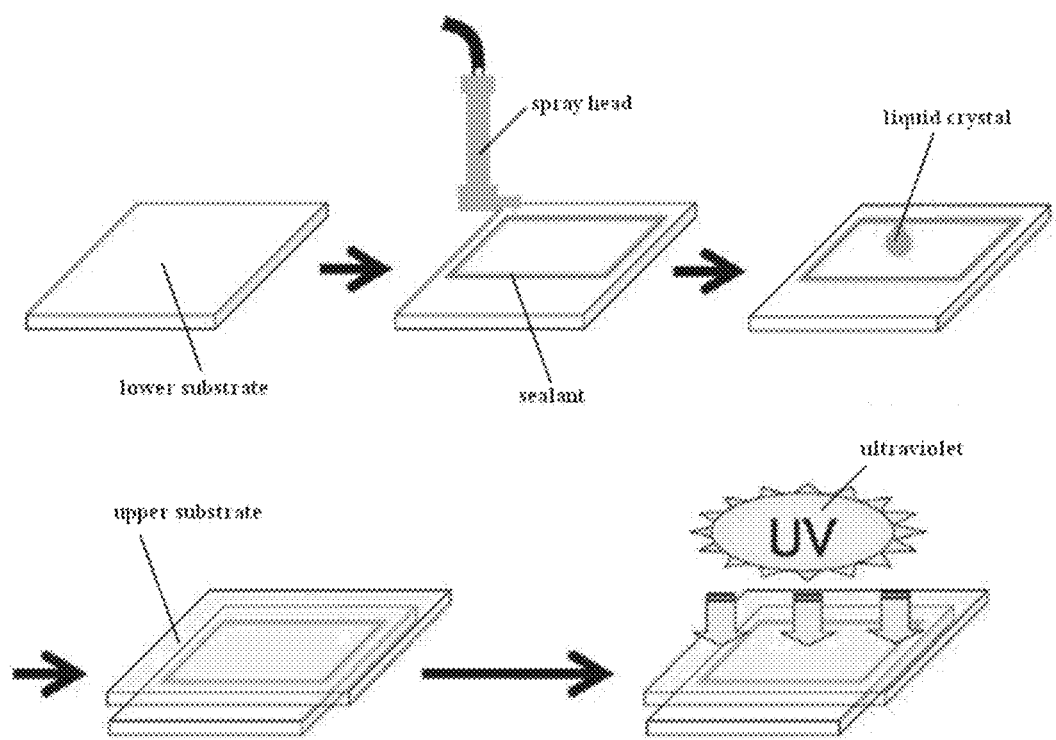
FIG. 1 is a flowchart illustrating a process for sealant coating.

Traditional sealant is mainly composed of resin and initiator. As shown in FIG. 1, a coating process for the sealant includes spray the sealant onto the peripheral area of the lower substrate using spray head, dripping liquid crystals onto the display area defined by the sealant, assembling the lower substrate with an upper substrate, pre-curing the sealant using the UV (Ultraviolet) irradiation, and finally thermo-curing the sealant (now shown in FIG. 1).

It has been noticed by the present inventors that the sealant is increasingly close to the display area as the bezels of display products are designed to be increasingly narrow. After assembling of the lower and upper substrates, the liquid crystal molecules may diffuse to spread out due to their fluidity. If the liquid crystal molecules come into contact with the sealant without being pre-cured by UV, the sealant may be punctured and the liquid crystal may be contaminated, leading to image flickering (FLK) during display OF the liquid crystal display panel and thus affecting display quality of the panel. Moreover, as bezels of display products are becoming narrower, the coating width of sealant is becoming smaller and moisture may intrude through the sealant to corrode circuit wiringS on the TFT substrate during subsequent usage, leading to abnormal display.

Figure 2:
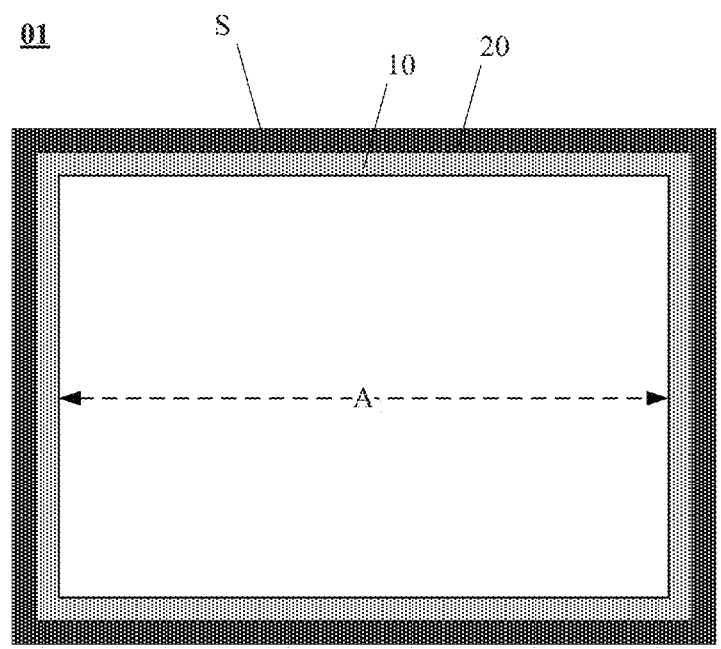
FIG. 2 is a structural diagram of a display panel provided in an embodiment of the present disclosure.

As shown in FIG. 2, an embodiment of the present disclosure provides a display panel 01 including a display area (indicated by A in the figure) and a peripheral area (indicated by S in the figure). The display panel 01 includes an oleophobic sealant 10 disposed in the peripheral area on the side near the display area and a hydrophobic sealant 20 disposed in the peripheral area on the side away from the display area and surrounding the oleophobic sealant 10.

It is to be noted that the display panel 01 further includes a first substrate and a second substrate disposed oppositely to each other, between which the above-mentioned oleophobic sealant 10 and the hydrophobic 20 are located. The first and second substrates may act respectively as an array substrate and a color filter substrate, or as color filter on array (COA) substrate and a cover substrate, and vice versa.

Figure 3:
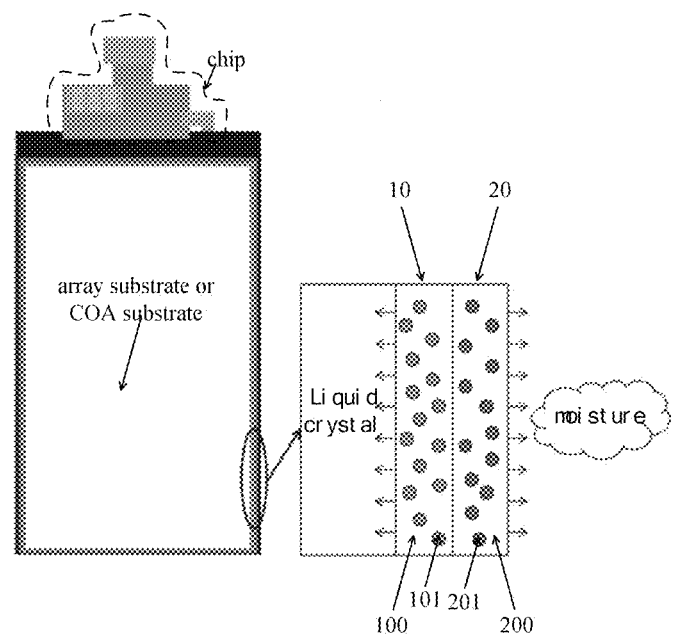
FIG. 3 is a schematic diagram illustrating effects of an oleophobic sealant and a hydrophobic sealant in a display panel provided in an embodiment of the present disclosure.

By way of example, as shown in FIG. 3, the array substrate or COA substrate (with structures such as chips bonded onto the side edge of its bezel area) is coated with the oleophobic sealant 10 and the hydrophobic sealant 20 and then assembled with the color filter substrate or the cover substrate.

For better comprehension of the above-mentioned oleophobic sealant 10 and hydrophobic sealant 20 provided in the embodiment of the present disclosure, the concept of "contact angle" will be introduced and explained in the following text. When a liquid drop is formed and stabilized on a solid surface, a contact angle θ of some magnitude will be formed by the liquid drop at the meeting line of the gas, liquid and solid phases.

Figure 4:
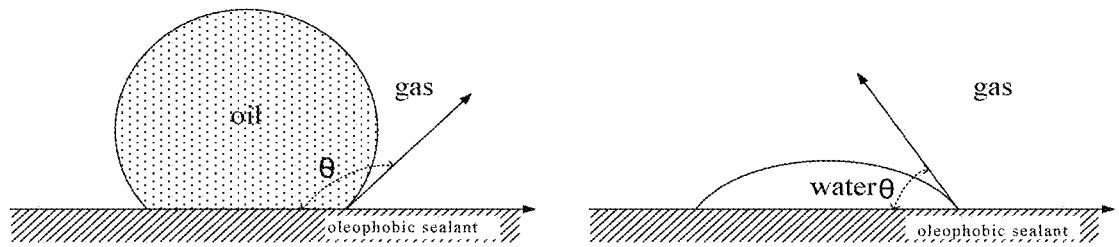
FIG. 4 is a schematic diagram illustrating contact angles of a type of oleophobic sealant provided in an embodiment of the present disclosure.

As shown in FIG. 4, the term "oleophobic sealant" means that this type of sealant has relatively higher repellence against oleiferous liquids, and drops of oleiferous liquids may have contact angels larger than 90° and it is hardly for them to spread out on the surface of the sealant. Relatively, the sealant has relatively higher affinity for water and aqueous liquids with similar dissolvability, so that the aqueous liquids may have contact angles smaller than or equal to 90° and it is easily for them to spread out on the surface of the sealant. As a result, the above-mentioned oleophobic sealant may also be referred to as hydrophilic sealant.

Figure 5:
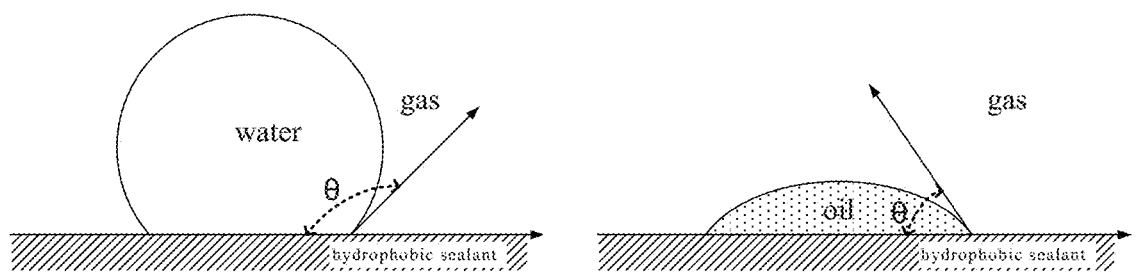
FIG. 5 is a schematic diagram illustrating contact angles of a type of hydrophobic sealant provided in an embodiment of the present disclosure.

Similarly, as shown in FIG. 5, the term "hydrophobic sealant" means that this type of sealant has relatively higher repellence against water and aqueous solutions of similar dissolvability, so that drops of aqueous liquids have contact angles larger than 90° and it is hardly for them to spread out on the surface of the sealant. Relatively, the sealant has relatively higher affinity for oleiferous liquids, so that the oleiferous liquids may have contact angles smaller than or equal to 90° and it is easily for them to spread out on the surface of the sealant. As a result, the above-mentioned hydrophobic sealant may also be referred to as oleophilic sealant.

In the above-mentioned display panel provided in the embodiment of the present disclosure, two types of sealants are disposed in the peripheral area of the display panel. The inner layer, i.e. the layer near the display area, is the oleophobic sealant 10. Since liquid crystals commonly used in liquid crystal displays including biphenyl liquid crystal, phenylcyclohexane liquid crystal, ester type liquid crystal and the like, are oleiferous and have no or very low solubility in water, the oleophobic sealant 10 near the display area may reduce the degree of contact between the liquid crystals and the oleophobic sealant without being completely cured, reduce the possibility of being punctured, protect the liquid crystals from being contaminated, reduce defects, such as FLK during display of the liquid crystal display panel, and guarantee display quality. The outer layer, i.e. the layer away from the display area and surrounding the oleophobic sealant 10, is the hydrophobic sealant 20 and can prevent moisture from intruding through the sealant to cause corrosion during subsequent usage.

Furthermore, for example and as shown in FIG. 3, the above-mentioned oleophobic sealant 10 includes matrix sealant material 100 and particles 101 dispersed in the matrix sealant material 100 with the dispersed particles 101 having oleophobic first functional groups (not shown in the figure) on their surfaces. The above-mentioned hydrophobic sealant 20 includes matrix sealant material 200 and particles 201 dispersed in the matrix sealant material 200 with the dispersed particles 201 having hydrophobic second functional groups (not shown in the figure) on their surfaces.

It is to be noted that the above-mentioned matrix sealant material 100 and the matrix sealant material 200 may include, but not limited to, resin materials. There are many resin materials to choose, such as acrylic resin, epoxy resin, bisphenol A epoxy resin, polyvinyl butyral resin, diethylene glycol monobutyl ether acetic ester, urethane resin containing carboxy groups and the like. In addition, the above-mentioned oleophobic sealant 10 or the hydrophobic sealant 20 may also include initiator and the like, in this regard, traditional technologies may be used and embodiments of the present disclosure are not limited in any way.

The so called "particle" refers to a geometric body within a dimensional range and having a particular shape. Herein, dimensions of a particle generally range in order of magnitude from nanometer to millimeter. Therefore, the above-mentioned dispersed particles 101 or dispersed particles 201 refer to particles that have relatively small dimensions and may have many shapes, for example, but not limited to, a spherical shape.

The dispersed particles (e.g. silicon balls) in the sealant function to provide some thickness support so as to reduce volume shrinkage of the sealant after being cured, and at the same time, to increase the viscosity of the sealant before being cured, so as to reduce sealant flowage, facilitating stirring and/or screen printing. In addition to having the function described above, the dispersed particles in the above-mentioned oleophobic sealant 10 or hydrophobic sealant 20 provided in the embodiment of the present disclosure also act as carriers for functional surface modification of functional groups.

For example, the material of the above-mentioned dispersed particles may include any one of silicon dioxide, silicon, aluminum oxide ($Al_2O_3$), and the particles may have a spherical shape to facilitate particle dispersing and functional group grafting.

Figure 6:
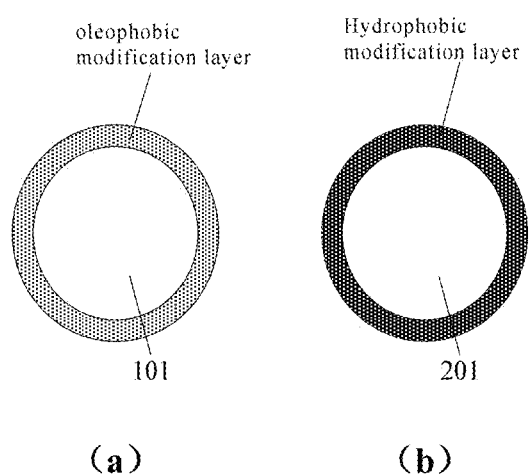
FIG. 6 is a schematically structural diagram of two types of dispersed particles provided in an embodiment of the present disclosure.

That is, as shown in the view (a) in FIG. 6, an oleophobic modifying layer consisting of the oleophobic first functional groups is formed on the surface of the dispersed particle 101, resulting in a shell-core structure.

Similarly, as shown in view (b) in FIG. 6, a hydrophobic modifying layer consisting of the hydrophobic second functional groups is formed on the surface of the dispersed particle 201, resulting in a shell-core structure.

It is to be noted that the above-mentioned FIG. 6 is only provided to indicate that a dispersed particle 101 has oleophobic first functional groups on its surface, and the first functional groups may be grafted on part of or the entire surface of the dispersed particle 101, which includes, but not limited to, the case indicated schematically in view (a) of FIG. 6) where the first functional groups cover the entire surface and thus form an oleophobic modifying layer.

In the same way, the above-mentioned FIG. 6 is provided to indicate that a dispersed particle 201 has the hydrophobic second functional groups on its surface, and the second functional groups may be grafted on part of or the entire of the surface of the dispersed particle 201, which includes, but not limited to, the case indicated schematically in the view (b) in FIG. 6 where the second functional groups cover the entire surface and thus form a hydrophobic modifying layer.

In this way, the surface modifying layer has a thickness in nanometers, no significant effect will be exerted on the dimensions of the dispersed particles and the line width of TFT wiring in the display panel will not be additionally increased, resulting in negligible effect on the width of the bezel of the display panel.

Furthermore, for example, the above-mentioned oleophobic first functional groups include at least one of a hydroxyl group (—OH), an aldehyde group (—CHO), a carboxyl group (—COOH) and an amino group (—$NH_2$).

The above-mentioned hydrophobic second functional group includes at least one of an alkyl group (—$C_nH_{(2n+1)}$, where n is a positive integer), a vinyl group (—CH=$CH_2$), a phenyl ring group (—$C_6H_5$), a halogen atom (including fluorine (F), chlorine (Cl), bromine (Br), iodine (I) and astatine (At), generally symbolized as —X) and a nitro group (—NO2).

The following embodiment is provided to illustrate the process of modification using the above-mentioned oleophobic or hydrophobic functional groups.

Embodiment 1

Modification by the oleophobic first functional groups: nano-particles of $SiO_2$ are used as the dispersed particles 101 in the oleophobic sealant 10. During the grafting process for the functional surface modification, 10 grams of nano-particles of $SiO_2$ are dispersed in 50 ml of HCl solution (the concentration of HCl in water is 10% volume/volume) contained in a 500 ml beaker. After uniformly stirring for 1 hour (h), the solid resultant is separated from the HCl solution and the $SiO_2$ nano-particles are washed several times by deionized water. The solid resultant is placed under a vacuum condition to evaporate the solvent on the surface, so that oleophobic, i.e. hydrophilic, activated $SiO_2$ nano-particles ($SiO_2$—OH) are obtained with the above-mentioned modification method, which has a yield of about 90%.

Embodiment 2

Modification by the hydrophobic second functional groups: nano-particles of $SiO_2$ are used as the dispersed particles 201 in the hydrophobic sealant 20. During the grafting process for the functional surface modification, 20 ml dehydrated alcohol is placed into a dry beaker, a given amount of dry nano-particles of $SiO_2$ are put into the dehydrated alcohol; ultrasonic dispersion is performed on the mixture for 15 min, which is then placed into a 250 ml three-neck flask. Dehydrated alcohol solution containing a given amount of silane coupling agent (having a molecular formula of $C_{10}H_{22}O_4Si$, generally marked as KH-570) is then put into the three-neck flask, which is heated to a certain temperature in water bath to achieve reflux reaction for 5 h. The solid resultant is centrifugally separated from the liquid, washed 3 times by dehydrated alcohol, and then placed into an oven at 100° C. to be dried for 10 h, resulting in nano-particles of $SiO_2$ modified by silane coupling agent. During this process, the hydrophobic functional groups for grafting on the surfaces are mainly alkyl groups and vinyl groups.

Figure 7:
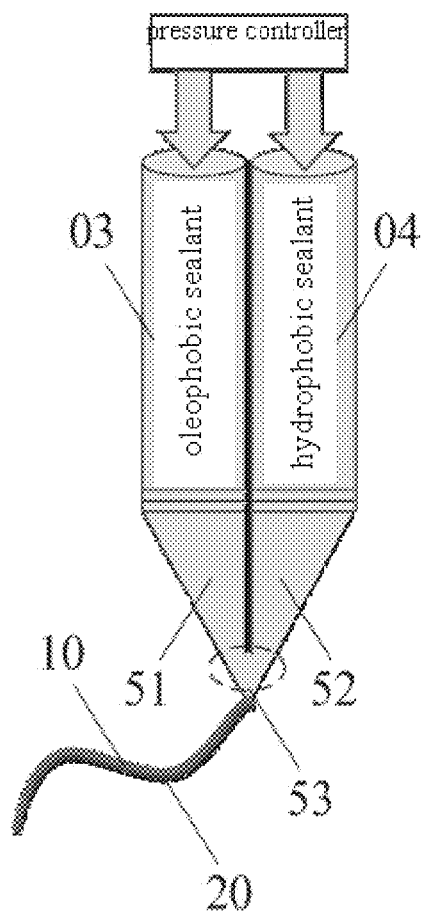
FIG. 7 is a schematically structural diagram of a device for sealant coating provided in an embodiment of the present disclosure.

Based on the description above, as shown in FIG. 7, an embodiment of the present disclosure also provides a sealant coating device, which includes a first sealant supplying container 03 (e.g. a sealant barrel), a second sealant supplying container (e.g. a sealant barrel) and a spray head 05. The spray head 05 includes a first accommodation chamber 51, a second accommodation chamber 52 and a slit opening 53. The first and second accommodation chambers 52, 53 are in intercommunication at the area near the slit opening 53 (resulting in a hybrid gun head as shown in the dashed-line box). The first and second sealant supplying container 03, 04 are respectively in communication with the ends of the first and second accommodation chambers 51, 52 away from the slit opening 53. The first sealant supplying container 03 is used to contain the oleophobic sealant and the second sealant supplying container 04 is used to contain the hydrophobic sealant.

Here, the first and second accommodation chambers 51, 52 are in intercommunication with each other at the area near the slit opening 53, so that a hybrid gun head is formed as shown in the dashed-line box, which can coat two types of sealants at the same time, simplifying the technical process.

The above-mentioned device for sealant coating has a simplified structure and needs relatively small modification to the fabrication process of an existing coating device. For example, the above-mentioned device may be realized by replacing a conventional single spray head with a spray head having the hybrid gun head and adding an additional sealant barrel, which is easy to carry out.

Furthermore, for example, as shown in FIG. 7, the above-mentioned device for sealant coating also includes a pressure controller to control the feeding amount of sealant from the first sealant supplying container and/or the second sealant supplying container.

Based on the description above, an embodiment of the present disclosure also provides a coating method with the above-mentioned device for sealant coating. The coating method includes: allowing a side of the second accommodation chamber of the spray head to face the display area of the first substrate (e.g. the array substrate or COA substrate as shown in FIG. 3) in the display panel; allowing a side of the first accommodation chamber of the spray head to face away from the display area; and controlling the spray head to spray the sealant along the peripheral area of the first substrate so as to form the hydrophobic sealant in the peripheral area and on the side near the display area and form the oleophobic sealant in the peripheral area on the side away from the display area and surrounding the hydrophobic sealant.

In the above-mentioned display panel provided in the embodiments of the present disclosure, two types of sealants are disposed in the peripheral area of the display panel. The inner layer, i.e. the layer near the display area, is the oleophobic sealant. Since liquid crystals commonly used in liquid crystal display mainly includes biphenyl liquid crystal, phenylcyclohexane liquid crystal, ester type liquid crystal and the like, which are oleiferous and have no or very low solubility in water, the oleophobic sealant near the display area may reduce the degree of contact between the liquid crystals and the oleophobic sealant before the sealant is not completely cured, reduce the possibility of being punctured, protect the liquid crystals from being contaminated, reduce defects, such as FLK during display of the liquid crystal display panel, and guarantee the display quality. The outer layer, i.e. the layer away from the display area and surrounding the oleophobic sealant, is the hydrophobic sealant and can prevent moisture from intruding through the sealant to cause corrosion during subsequent usage.

It can be appreciated by those skilled in the art that structural composition of the above-mentioned oleophobic sealant and/or hydrophobic sealant and components of the device for sealant coating provided in embodiments of the present disclosure are not limited by the structures shown schematically in all of the accompanying drawings in the present disclosure, which are provided only to clearly depict structures associated with the inventive points. Those structures unrelated with the inventive points may be implemented with conventional structures and are not or only partially shown in the accompanying drawings.

The described above are only exemplary embodiments of the present disclosure, and the present disclosure is not intended to be limited thereto. For one of ordinary skill in the art, various changes and alternations may be readily contemplated without departing from the technical scope of the present disclosure, and all of these changes and alternations shall fall within the scope of the present disclosure.

What is claimed is:

1. A display panel, comprising:
   a first substrate and a second substrate arranged oppositely to the first substrate that are assembled to form a cell;
   a display area and a peripheral area;
   an oleophobic sealant layer provided in the peripheral area on a side near the display area on the first substrate; and
   a hydrophobic sealant layer provided in the peripheral area on a side away from the display area and surrounding the oleophobic sealant layer on the first substrate;
   wherein the oleophobic sealant layer comprises a matrix sealant material and first particles dispersed in the matrix sealant material, the first dispersed particles are configured to be carriers consisting essentially of oleophobic first functional groups on their surfaces;
   the hydrophobic sealant layer comprises a matrix sealant material and second particles dispersed in the matrix sealant material, the second dispersed particles are configured to be carriers consisting essentially of hydrophobic second functional groups on their surfaces;
   the oleophobic first functional group comprises at least one of —OH, —CHO, —COOH, and —NH$_2$; and
   the hydrophobic second functional group comprises at least one of —C$_n$H$_{(2n+1)}$, —CH=CH$_2$, —C$_6$H$_5$, a halogen atom, and —NO$_2$, where n is a positive integer.

2. The display panel according to claim 1, wherein the first dispersed particles and the second dispersed particles comprises any of silicon dioxide, silicon and aluminum oxide (Al$_2$O$_3$).

3. The display panel according to claim 1, wherein the first dispersed particles and the second dispersed particles are in a spherical shape.

4. A display panel, comprising:
   a first substrate and a second substrate arranged oppositely to the first substrate;
   a display area and a peripheral area;
   an oleophobic sealant layer provided in the peripheral area on a side near the display area on the first substrate; and
   a hydrophobic sealant layer provided in the peripheral area on a side away from the display area and surrounding the oleophobic sealant layer on the first substrate;
   wherein the oleophobic sealant layer comprises a matrix sealant material and first particles dispersed in the matrix sealant material, the first dispersed particles are configured to be carriers consisting essentially of oleophobic first functional groups on their surfaces;
   the hydrophobic sealant layer comprises a matrix sealant material and second particles dispersed in the matrix sealant material, the second dispersed particles are configured to be carriers consisting essentially of hydrophobic second functional groups on their surfaces;
   the oleophobic first functional group comprises at least one of —OH, —CHO, COOH, and —NH$_2$; and
   the hydrophobic second functional group comprises at least one of —C$_n$H$_{(2n+1)}$, —CH=CH$_2$, —C$_6$H$_5$, a halogen atom, and —NO$_2$, where n is a positive integer.

5. The display panel according to claim 4, wherein the first dispersed particles and the second dispersed particles comprises any of silicon dioxide, silicon and aluminum oxide (Al$_2$O$_3$).

6. The display panel according to claim 4, wherein the first dispersed particles and the second dispersed particles are in a spherical shape.

\* \* \* \* \*